(12) United States Patent  
Jenks (10) Patent No.: US 6,549,399 B2
(45) Date of Patent: Apr. 15, 2003

(54) DOOR MECHANISM FOR HANDHELD COMPUTER

(75) Inventor: Kenneth Arthur Jenks, Capitola, CA (US)

(73) Assignee: Palm, Inc., Santa Clara, CA (US)

( * ) Notice: Subject to any disclaimer, the term of this patent is extended or adjusted under 35 U.S.C. 154(b) by 192 days.

(21) Appl. No.: 09/738,541

(22) Filed: Dec. 15, 2000

(65) Prior Publication Data

US 2002/0075639 A1 Jun. 20, 2002

(51) Int. Cl.$^7$ .................................................. G06F 1/16
(52) U.S. Cl. ........................................ 361/683; 361/686
(58) Field of Search ................................. 361/683, 686

(56) References Cited

U.S. PATENT DOCUMENTS

| | | |
|---|---|---|
| 4,772,214 A | 9/1988 | Stoegmueller |
| 4,773,032 A | 9/1988 | Uchara et al. |
| 4,843,226 A | 6/1989 | Kato et al. |
| 5,187,645 A | 2/1993 | Spalding et al. |
| 5,209,583 A | 5/1993 | Lewis et al. |
| 5,224,869 A | 7/1993 | Lee |
| 5,323,291 A | 6/1994 | Boyle et al. |
| 5,463,742 A | 10/1995 | Kobayashi |
| 5,488,572 A | 1/1996 | Belmont |
| 5,554,822 A | 9/1996 | Gilpin et al. |
| 5,555,491 A | 9/1996 | Tao |
| 5,559,672 A | 9/1996 | Burns, Jr. et al. |
| 5,598,539 A | 1/1997 | Gephardt et al. |
| 5,615,259 A * | 3/1997 | Gilbert ...................... 379/433 |
| 5,632,020 A | 5/1997 | Gephardt et al. |
| 5,644,471 A | 7/1997 | Schulta et al. |
| 5,687,060 A | 11/1997 | Ruch et al. |
| 5,701,232 A | 12/1997 | Tang et al. |
| 5,738,536 A * | 4/1998 | Ohgami et al. ............. 439/142 |
| 5,961,337 A | 10/1999 | Kordes |
| 6,023,147 A * | 2/2000 | Cargin, Jr. et al. .......... 320/114 |
| 6,434,371 B1 * | 8/2002 | Claxton ....................... 455/90 |

* cited by examiner

Primary Examiner—Darren Schuberg
Assistant Examiner—Yean Hsi Chang
(74) Attorney, Agent, or Firm—Van Mahamedi; Hickman Palermo Truong & Becker LLP (57) ABSTRACT

A door mechanism is provided for a handheld computer. The door mechanism includes a detachable section that is extendable from an interior of the handheld computer's housing. The detachable section is biased to pivot towards the housing from the extended position. An interior of the detachable section includes a coupling structure to receive an external electrical component. The detachable section may be returned to a closed position to cause the external electrical component to make contact with an interior element of the handheld computer.

16 Claims, 12 Drawing Sheets

DOOR MECHANISM FOR HANDHELD COMPUTER

BACKGROUND OF THE INVENTION

1. Field of the Invention

This invention relates to the field of handheld computers. In particular, the invention relates to a door mechanism for a handheld computer.

2. Description of the Related Art

Handheld computers are compact devices in which size constraints and mobility considerations influence functionality. In particular, applications for use with handheld computers are not always desirable for all users because such applications may require space, consume battery life, or burden other resources. One approach handheld computers incorporate is to be modularized for use with external devices and accessories. Expansion ports and connectors are sometimes incorporated with handheld computers to provide features such as expanded memory and processing abilities. The expansion ports and connectors are coupled to devices that may need to be protected.

Figure 12:
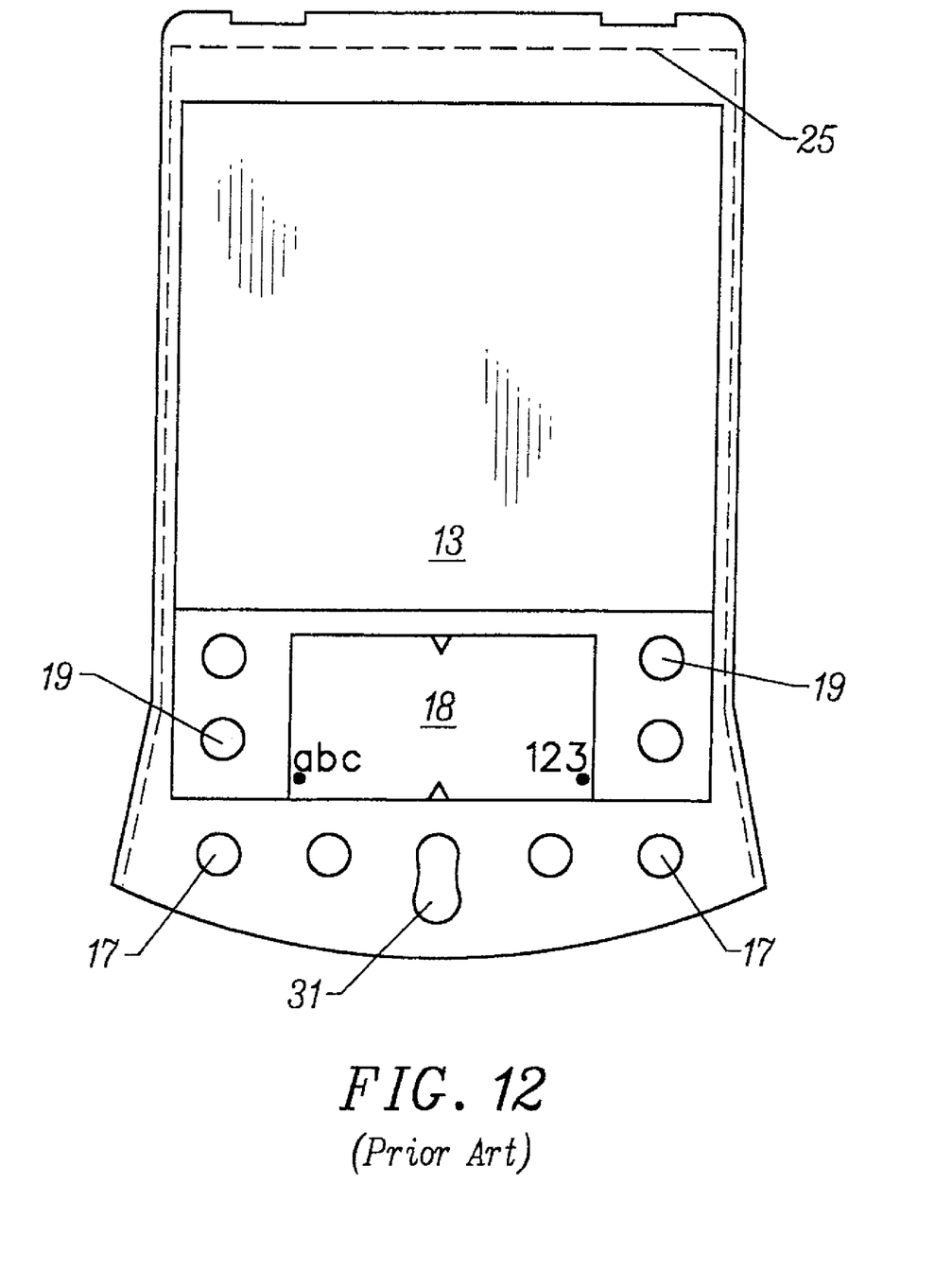
FIG. 12 is a prior art illustration of a handheld computer for use with embodiments of the invention.

FIG. 12 illustrates a handheld computer 100, for use with peripheral devices, as described with embodiment of the invention. Examples of handheld computers 100 include palm style computers such as a PalmPilot®, Palm III®, or Palm V®, or Palm VII® organizers, manufactured by Palm Inc. Other types of handheld computers include devices operating under Windows CE™ or PocketPC® operating systems. Still further, handheld computers may include wireless devices such as cell-phones and wireless access protocol (WAP) enabled devices.

The handheld computer 100 may include interactive hardware and software that perform functions such as maintaining calendars and phone lists. The handheld computer 100 of FIG. 12 includes a front face 25 having a plurality of input functions keys 17, a rocking switch 31, and a display 13 having graphic user interface features. The display 13 may be provided with an interface that allows the user to select and alter displayed content using a pointer such as a stylus. In one example, the display 13 includes a Graffiti® writing section 18 for tracing alphanumeric characters as input. A plurality of input buttons 19 for performing automated or pre-programmed functions may be provided on a portion of the display 13.

SUMMARY OF THE INVENTION

An embodiment of the invention includes a door mechanism for a handheld computer. The door mechanism includes a detachable section that can be pivoted from the housing beyond 90 degrees. In one embodiment, the detachable section may be pivoted to the extent that the detachable section is obstructed from further pivoting by the housing. The hinge structure may also be biased to enable the detachable section to snap back into a closed position after being pivoted open.

DETAILED DESCRIPTION

A. Overview

An embodiment of the invention includes a handheld computer having a housing. The housing has a front face and a back face. A detachable section may be positioned on either the front face or back face of the housing. The detachable section may be a uniform or integrated portion of the housing when in the closed position. The detachable section may be pivoted to form an opening on the housing. A hinge may couple to provide a pivot for the detachable section. The hinge may move or displace as the detachable section is swung out from the housing, so as to provide the detachable section with greater pivoting freedom.

Reference to the term "detachable section" implies that the section can separate on one or more ends from another structure. The term does not necessarily imply complete separation, as the section may still be coupled to the structure by a hinge or pivot.

In an embodiment, a hinge element is caused to extend out of the housing by the motion of the detachable section. The motion of the hinge element enables the detachable section to have a pivot range that is greater than 90 degrees.

Furthermore, the hinge structure may be biased to enable the detachable section to move back to the closed position upon being released from an open position. The hinge structure may also be biased to move the hinge element back into the confines of the housing as the detachable section is returned to the closed position.

One advantage provided by an embodiment of the invention is that the detachable section is extendable to swing outward without any limitation to the pivot range about the hinge. As a result, the door mechanism is less susceptible to breakage from use.

In an embodiment, the detachable section of the door mechanism is operable to provide users access to an interior space of the handheld computer. The interior space may house a connector or other electrical component. The door may have sufficient range of motion to swing out and contact the housing. A maximum angle formed by the door swinging out relative to the housing may range approximately between 90–180 degrees.

Another advantage provided by an embodiment of the invention is that door mechanism may have biasing elements to return the detachable section to a closed position. This allows the user to close the door on the handheld computer simply be letting the door go from any open position.

Still further, another advantage under an embodiment of the invention is that a coupling structure may be provided on an interior of the detachable section to couple with external electrical components, such as batteries, memory cards and other computer chips. The detachable section may be returned to a closed position to effectuate an electrical coupling between the external electrical component and an interior component of the handheld computer.

B. Detachable Section with Displaceable Hinge

Figure 1:
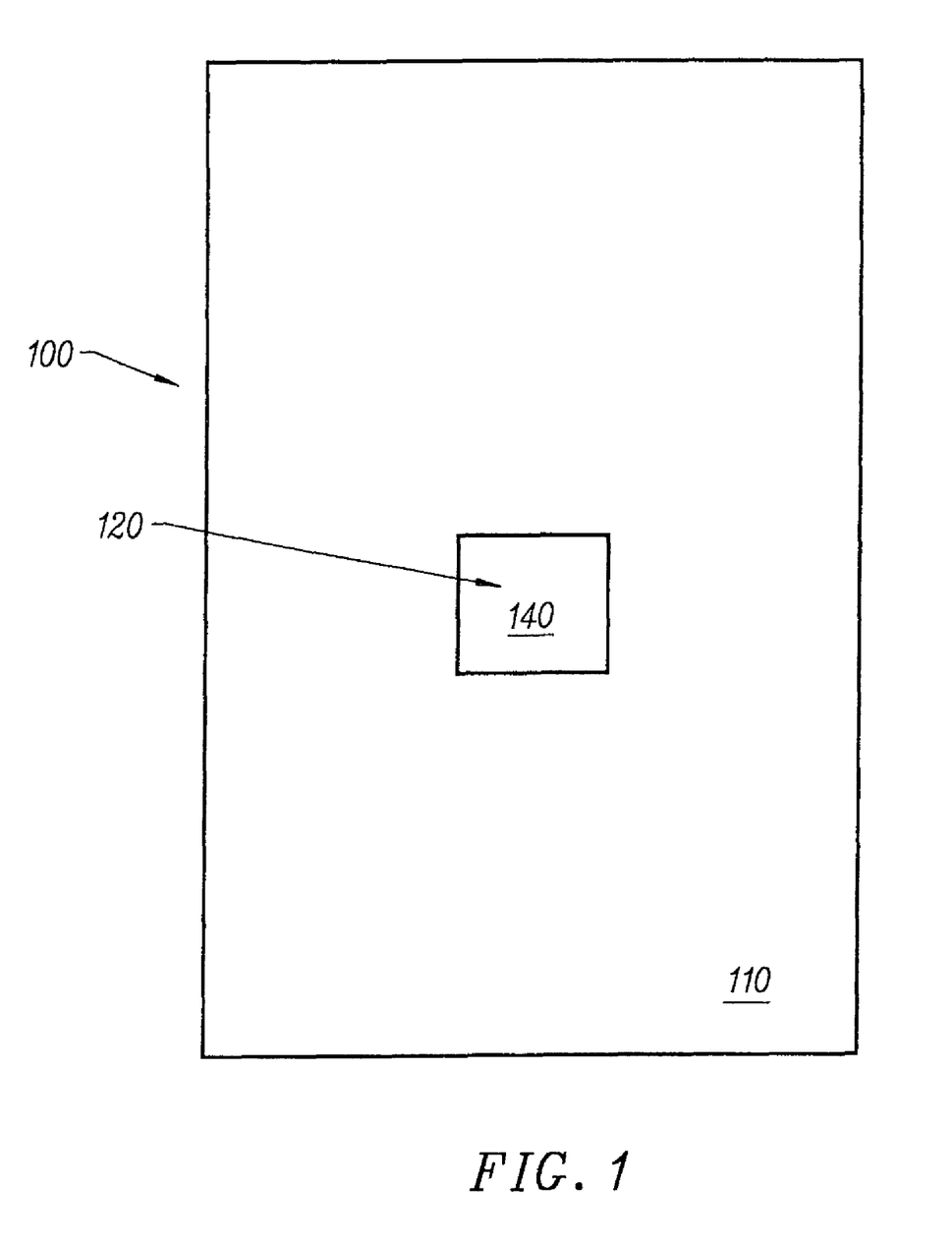
FIG. 1 is a back view of a handheld computer incorporating a door mechanism, under an embodiment of the invention.

FIG. 1 illustrates a handheld computer 100 incorporating a door mechanism 120, under an embodiment of the invention. The door mechanism 120 refers to a feature on a housing 110 of the handheld computer 100 that confines an interior space within the handheld computer 100. In an embodiment, the door mechanism 120 includes a detachable section 140 having a pivot end 142 (FIG. 2) that remains connected to the housing 110 as the detachable section is moved to open and close the door mechanism. In an embodiment such as described, door mechanism 120 includes a displaceable hinge that facilitates detachable section 140 from swinging at angles exceeding 90 degrees relative to housing 110 of handheld computer 100. Under an embodiment, detachable section 140 may swing approximately 180 degrees from the closed position.

The handheld computer 100 may use door mechanism 120 to retain a removable electrical component 156 in contact with an interior electrical component 158 of handheld computer 100. For example, the door mechanism 120 may be used to hold an insertable memory card, battery, or other external computer chip in contact with a connector housed within handheld computer 100. The door mechanism 120 may be used with such devices to expand the functionality of handheld computer 100.

Examples of handheld computers for use with embodiments of the invention include devices operating a Palm®, Windows CE®, or Windows PocketPC® device. Other examples include devices equipped for use as cellular phones, wireless devices including Wireless Access Protocol (WAP) enabled devices and wireless devices using web-browsers. Specific examples of such devices include PalmPilot®V, Palm III®, Palm V®, and Palm VII® electronic organizers, manufactured by Palm Inc.

In an embodiment, the door mechanism is provided on a back face 115 of a housing 110. The back face 115 opposes a front face (See e.g. element 25 of FIG. 12), which may provide a display 14 (FIG. 12) and a plurality of application buttons 26 (FIG. 12). Other embodiments of the invention may provide the door mechanism 120 elsewhere, such as on the front face 25, or a peripheral surface. The user may open door mechanism 120 to insert an electrical component.

Figure 2:
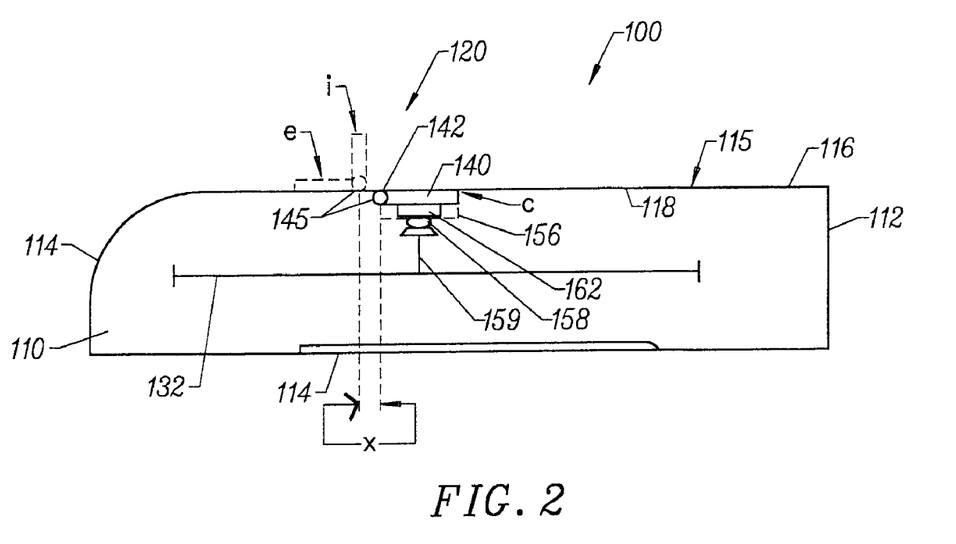
FIG. 2 is a side view of a door mechanism in operation, with different positions of a detachable section shown in phantom, under an embodiment of the invention.

FIG. 2 is a side view of handheld computer 100, illustrating operation of the door mechanism 120, under an embodiment of the invention. The door mechanism 120 includes the detachable section 140 and a hinge 145. The detachable section 140 that swings open on the back face 115 of the housing 110. The detachable section 140 includes a pivot end 142 that is coupled to hinge 145. The hinge 145 may be anchored or coupled to an interior surface of housing 110.

Preferably, door mechanism 120 is provided on back face 115 of housing 110. The back face 115 includes an exterior surface 116 and an interior surface 118. In an embodiment, at least a portion of door mechanism 120 is coupled to interior surface 118. The housing 110 includes a top end 112 and a bottom end 114. Preferably, the top and bottom ends 112 and 114 define a length of housing 110.

In an embodiment, detachable section 140 is positionable between a closed position and a fully extended position. FIG. 2 illustrates detachable section 140 in three positions, including the closed position c, the extended position e (in phantom) and an intermediate position i (in phantom). The housing 110 retains a printed circuit board (PCB) 132, providing a processor (not shown), memory (not shown) and other electrical components. The detachable section 140 confines an interior space 162. The interior space 162 includes an interior electrical component 158, such as a connector or contact element. The interior electrical component 158 is coupled to PCB 132 through an electrical connection 159.

In a closed position, detachable section 140 is positioned against or otherwise proximate to housing 110. Preferably, detachable section 140 provides an exterior surface that is flush with the back face 115 of housing 110. The detachable section 140 overlays all of interior space 162. The hinge 145 is positioned within confines of housing 110. A pivot end 142 of detachable section 140 is coupled to hinge 145 and also retained within confines of housing 110.

FIG. 2 shows detachable section 140 being moveable from the closed position to an intermediate position. Preferably, the intermediate position coincides with detachable section 140 being extended from housing 110 at an angle of about 90 degrees. Reference to "about" an angle preferably implies a range of plus/minus ten degrees. While detachable section 140 is being raised to the intermediate position, door mechanism 120 translates within housing 110. In an embodiment, when detachable section 140 is extended about 90 degrees, hinge 145 and detachable section 140 have moved a distance x within housing 110. Preferably, hinge 145 and detachable section 140 are moved towards bottom end 114 of housing 110. The hinge 145 remains within confines of housing 10.

In an embodiment such as shown by FIG. 2, detachable section 140 can only be extended to the intermediate position before hinge 145 is moved outside of housing 110. With hinge 145 moved outside of housing 110, pivot end 142 of detachable section 140 is free to move further back without obstruction from housing 110. FIG. 2 further shows door mechanism 120 operable from to a fully open or extended position. In the extended position, hinge 145 has moved outside of housing 110. This can give hinge 145 sufficient freedom to position the exterior side of detachable section 140 against the exterior surface 116 of housing 110.

The detachable section 140 may be moved from the closed position to provide access for inserting a detachable electrical component 156 into interior space 162. The detachable section 140 may provide sufficient clearance to enable electrical component 156 to be inserted in interior space 162 when detachable section 140 is in a position between the closed position and the intermediate position, or between the intermediate position and the extended position. When inserted, removable electrical component 156 is positioned to contact interior electrical component 158, so as to couple with PCB 132. Further to this end, the interior surface of detachable section 140 may be adapted to couple with removable electrical component 156. The user can couple the detachable electrical component 156 to the interior surface of detachable section 140 and return detachable section 140 to the closed position. When detachable section 140 is in the closed position, removable electrical component 156 is in position to make electrical contact with the interior electrical component 158. In another embodiments, detachable section 140 may be opened to enable electrical component 156 to be directly placed within a structure of interior space 162. The removable electrical component 156 may make electrical contact with interior electrical component 158 immediately, or when detachable section 140 is moved to a particular position, such as the closed position.

Furthermore, door mechanism 120 may bias detachable surface 140 and hinge 145 so as to return the detachable surface to the closed position. Preferably, the bias provided is sufficient to snap the detachable surface back into the closed position. An example of a hinge structure that biases detachable surface 140 is provided below, with FIGS. 3–11.

C. Biased Detachable Section with Displaceable Hinge

FIGS. 3–12 illustrate operation of a door mechanism 220 having a displaceable hinge that biases a detachable section 240 to the closed position. The door mechanism 220 may be placed on a surface of housing 110 as described with previous embodiments. In addition to advantages mentioned above, the detachable section 240 is biased to return to the closed position after being moved to a position to enable access to interior space 162.

Figure 3:
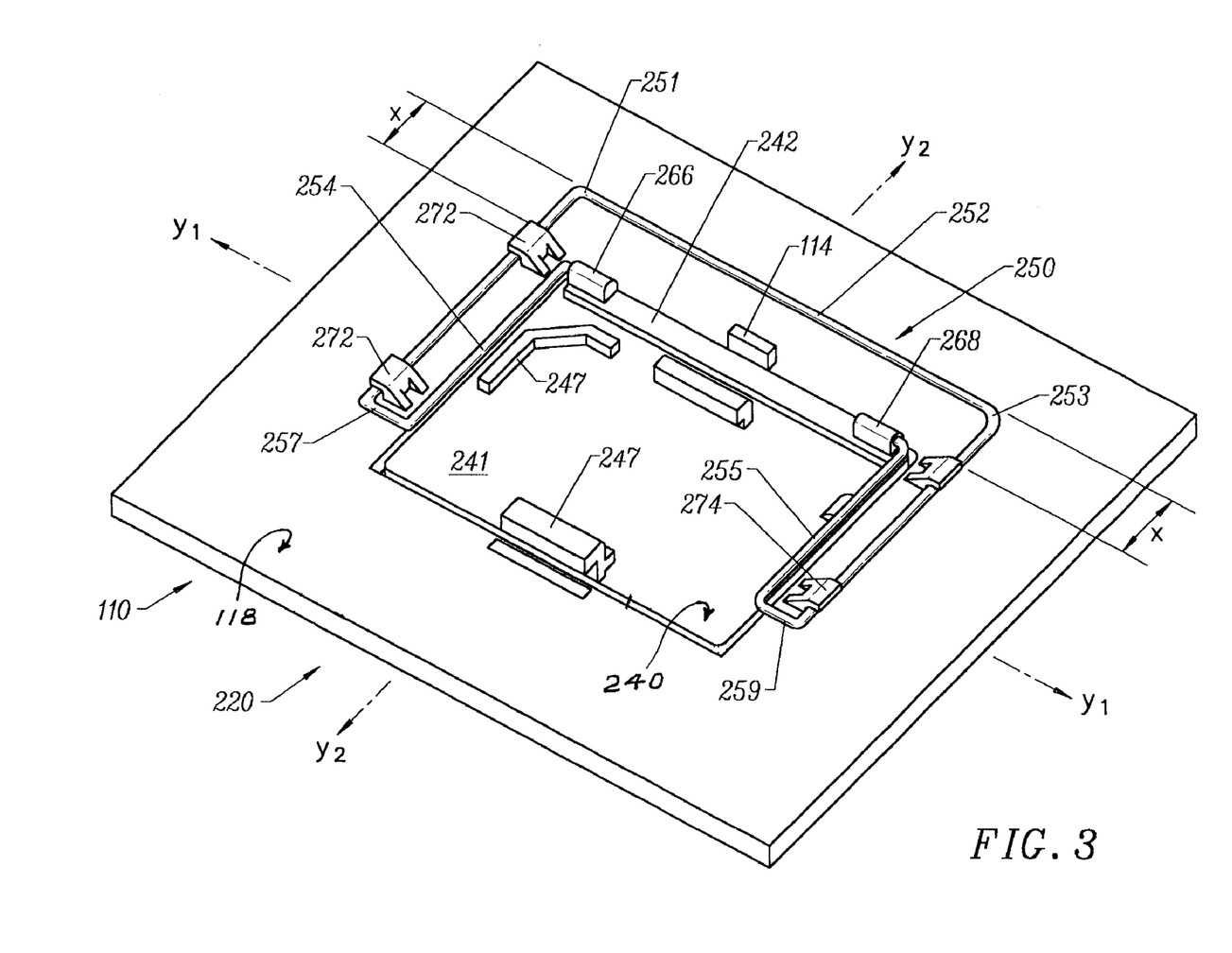
FIG. 3 is an isometric view of a door mechanism operable on a surface of a handheld computer, under an embodiment of the invention.

In an embodiment, door mechanism 220 includes detachable section 240 and hinge structure 250. The detachable section 240 includes an interior side 241, and an exterior side 243. The interior side 241 includes a coupling structure 247, configured to receive electrical component 156. The coupling structure 247 may be an integrated or unitary construction, such as provided by opposing walls adapted to slideable receive and retain electrical component 156.

The hinge structure 250 may be unitary and shaped to form a plurality of members and segments. The hinge structure 250 includes first bias member 252, second bias member 254, and third bias member 255. The first bias member 252 extends primarily along a first axis $y_1$ within confines of housing 110, and specifically along a plane or tangential surface of interior surface 118. The first bias member 252 may be bent or slightly curved to facilitate creation of a bias. The second bias member 254 and third bias member 255 extend primarily along a second axis $Y_2$. The second axis $y_2$ extends within confines of interior surface 118, and preferably along a plane or tangential surface of interior surface 118. Preferably, the second axis $y_2$ is orthanormal to first axis $y_1$.

The first bias member 252 is interconnected to second bias member 254 via a first placement member 256 and a first u-shaped segment 257. The first placement member 256 extends from a proximal end 251 of first bias member 252. The first u-shaped segment 257 joins first placement member 256 and second bias member 254, allowing first placement member 256 and second bias member 254 to extend primarily in the same direction. Similarly, first bias member 252 is interconnected to third bias member 255 via a second placement member 258 and a second u-shaped segment 259. The second placement member 258 extends from a distal end 253 of first bias member 252. The second u-shaped segment 259 joins third bias member 255 and second primary member 256, so that third bias member 255 and second primary member 256 also extend primarily in the same direction. In this way, first placement member 256, second placement member 258, second bias member 254, and third bias member 255 all extend primarily along the second axis $y_2$.

In an embodiment, the interior side 241 of detachable section 240 includes features for retaining electrical component 256. For example, interior side 241 may include a plurality of retention features 247 configured to form a slot 245 for receiving electrical component 156. The interior side 241 of detachable section 240 also includes a first hinge element 266 and a second hinge element 268. The first and second hinge elements 266, 268 are provided on or adjacent to pivot end 242 of detachable section 240. The first hinge element 266 couples a free end of second bias member 254, and the second hinge element 268 couples a free end of third bias member 255. This allows detachable section 240 to pivotally couple to hinge structure 250 about pivot end 242.

The door mechanism 220 includes features integrated or otherwise unitarily formed into housing 110 for coupling hinge structure 250 to detachable section 240. A first pair of grips 272, 272 slideably engage first placement member 256, allowing hinge structure 250 to translate primarily along the second axis $y_2$, but not along the first axis $y_1$. A second pair of grips 274, 275 perform the same function for second placement member 258.

The interior surface 118 of housing 110 also includes stop 114. When detachable section 240 is in the closed position, first bias member 252 is positioned distance x away from stop 114. The hinge structure 250 may translate primarily along the second axis $y_2$ so that first bias member 252 abuts against stop 114 to preclude further movement in that direction.

Figure 4:
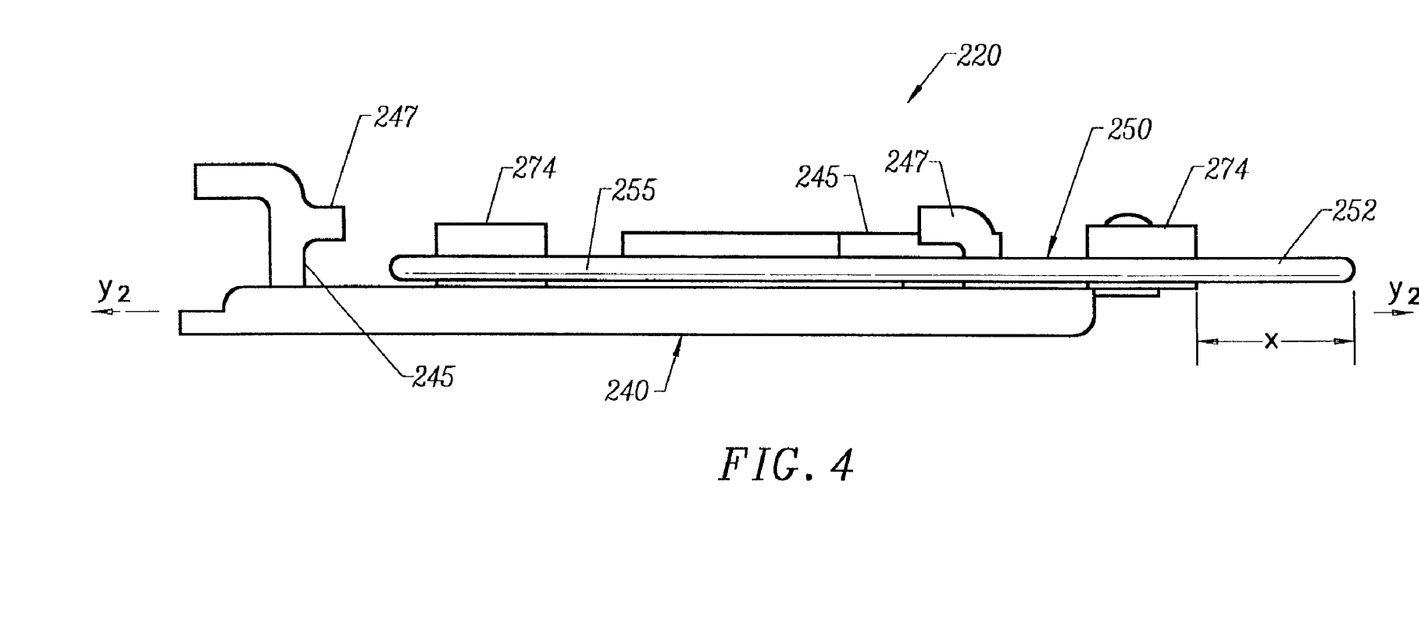
FIG. 4 is a side view of the door mechanism in the closed position, shown without the handheld computer, under an embodiment of the invention.

FIG. 4 is a side view of door mechanism 220. The hinge structure 250 is mounted over the interior side 241 of detachable section 240. The first bias member 252 is positioned distance x from stop 114. The second pair of grips 274 slideably engages third bias member 255, allowing hinge structure 250 to translate along the second axis $y_2$. The retention features 247 formed on the interior side 241 of detachable section 240 are configured to form a slot 245. The slot 245 is dimensioned to receive electrical component 156.

Figure 5:
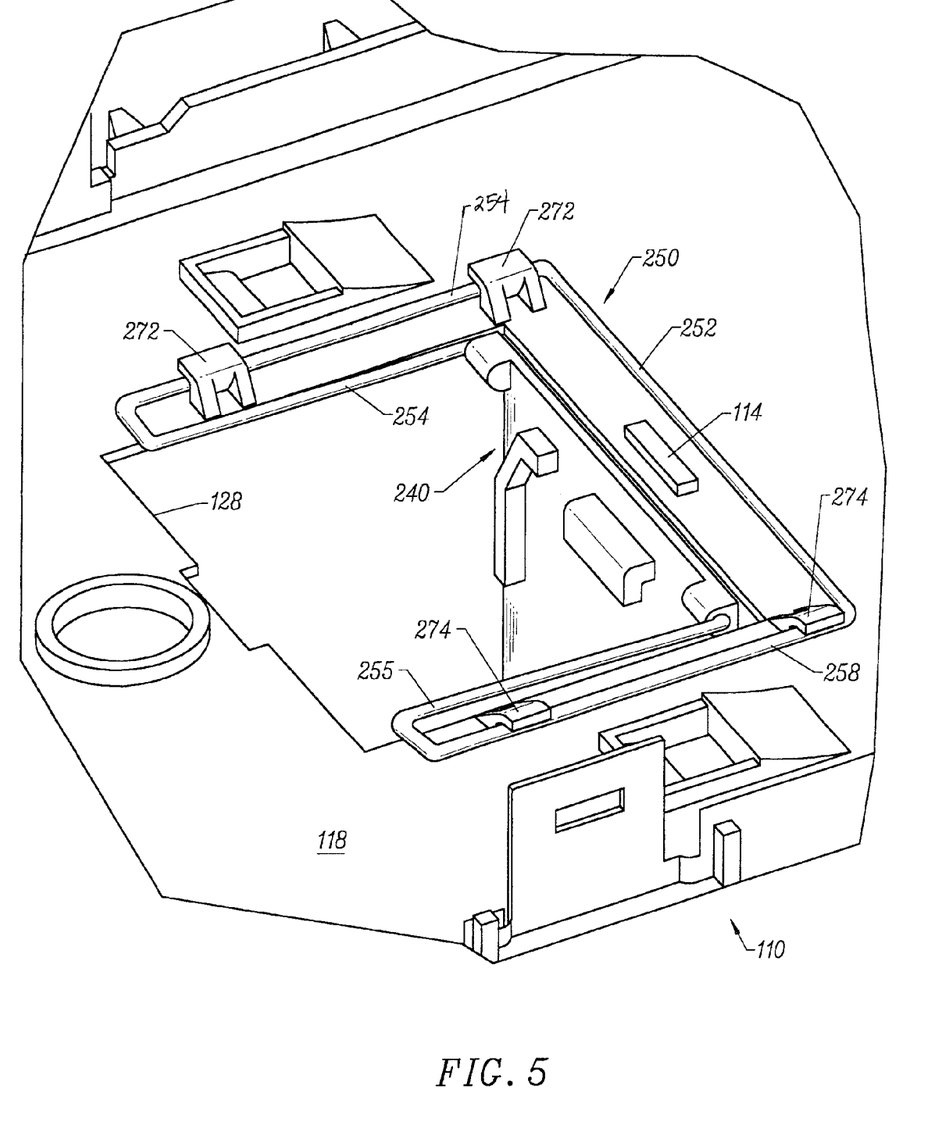
FIG. 5 is an isometric view of the door mechanism contained within the housing and partially extended, under an embodiment of the invention.

FIG. 5 illustrates detachable section 240 in a partially extended or intermediate position. The detachable section 240 is extended at about 90 degrees from back face 115 of housing 110 to form an opening 128. When detachable section 240, hinge structure 250 is caused to translate distance x. In an embodiment, detachable section 240 extending 90 degrees coincides with hinge structure 250 moving distance x so that first bias member 252 abuts stop 114. Furthermore, in this position, the proximal and distal ends of first bias member 252 are precluded from slideably engaging the pairs of grips 272, 274. The first bias member 252 is directed against stop 114 so as to push first bias member 252 in a direction of the second axis $y_2$. This causes the bow in first bias member 252 to be reduced or reversed. The result is that first bias member 252 becomes biased towards directing hinge structure 250 in the opposite direction of the translation. In an embodiment, the bias is sufficient to direct second bias member 254 and third bias member 255 against the direction of translation, and to cause detachable section 240 to move towards the closed position.

Figure 6:
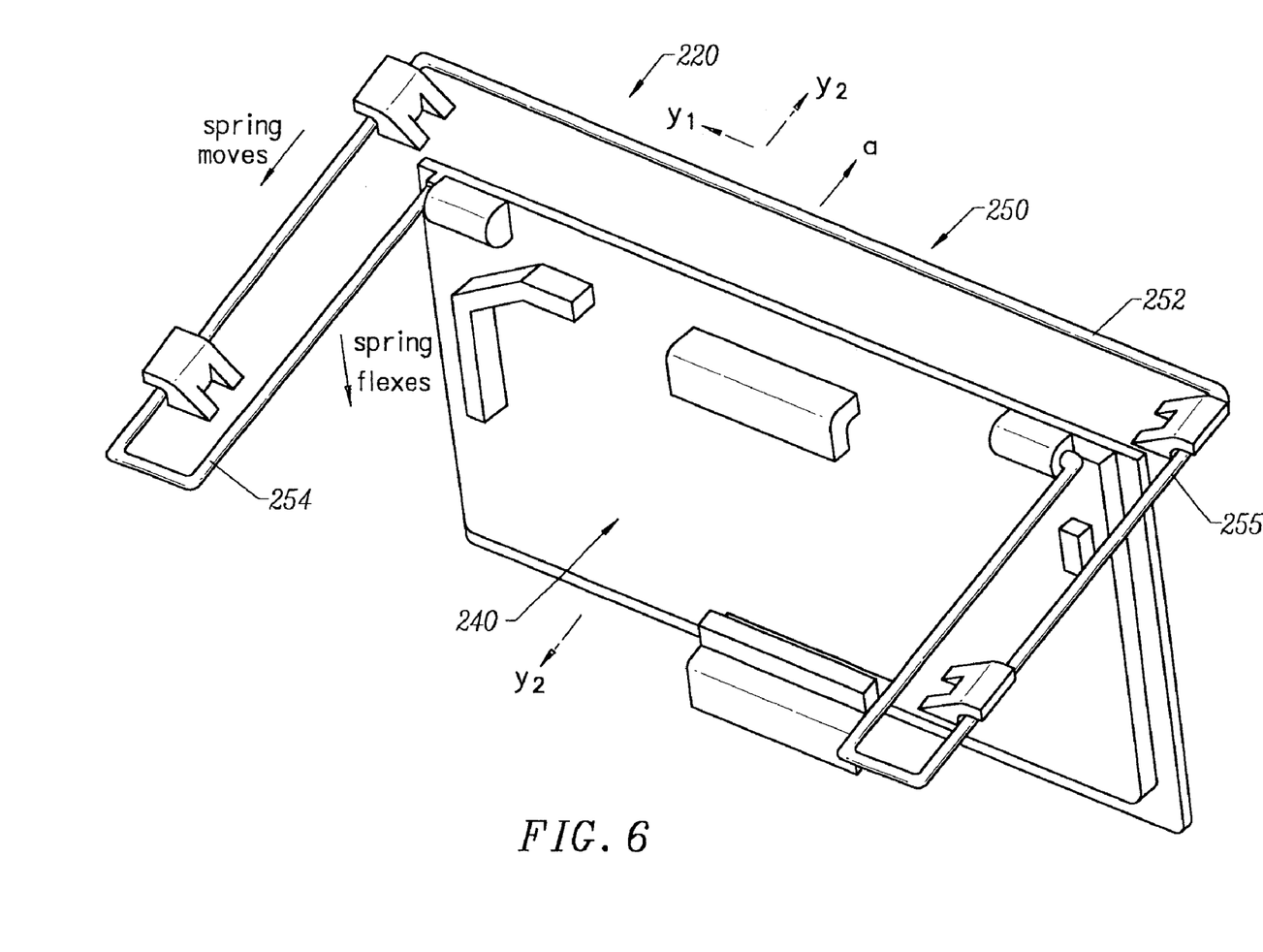
FIG. 6 is an isometric view of the door mechanism partially extended, shown without the housing, under an embodiment of the invention.

FIG. 6 illustrates door mechanism 220 removed from housing 110, with hinge structure 250 and detachable section 240 in a partially extended state, as described with FIG. 5. In a partially extended state, first bias member 252 is relatively straight because the bend in its length is pressed against stop 114 (FIG. 5). The resulting bias is directed along the second axis $y_2$, according to directional arrow a. In addition, when detachable section 240 is pivoted to 90 degrees, second bias member 254 and third bias member 255 may also be flexed. The flexure of second bias member 254 and third bias member 255 creates another bias to resist detachable section 240 from swinging further from the closed position. The biases of first bias member 252, second bias member 254 and third bias member 255 combine to enable detachable section 240 to swing back into the closed position when released from any extended position.

Figure 7:
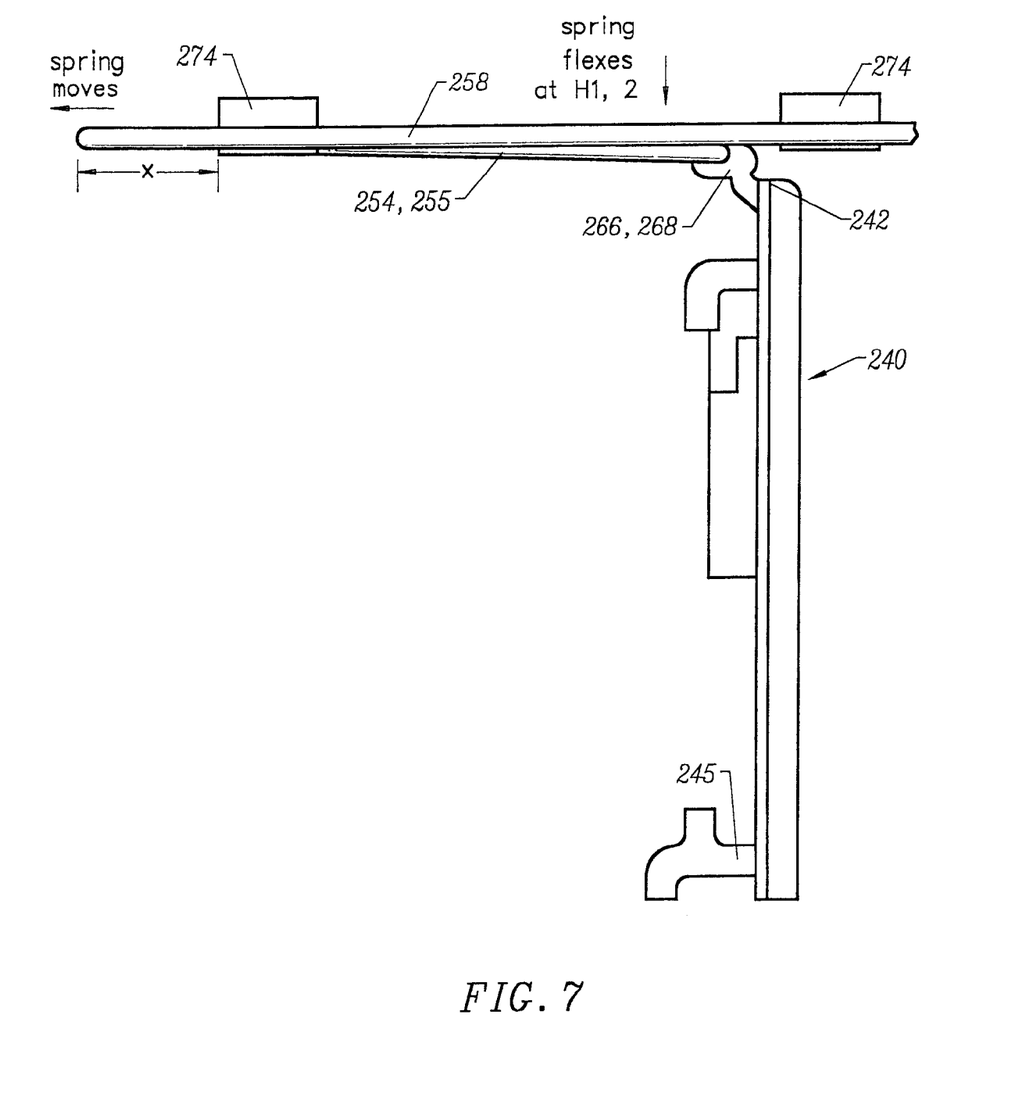
FIG. 7 is a side view of the door mechanism partially extended, shown without the housing, under an embodiment of the invention.

FIG. 7 is a side view of door mechanism 220, removed from housing 110 and partially extended, as described with FIGS. 5 and 6. The slot 245 is positioned to readily receive electrical component 156 (FIG. 2). The pivot end 242 is coupled, integrated or otherwise uniformly joined with first hinge element 266 and second hinge element 268. The hinge elements 266, 268 are pivotally coupled to second bias member 254 and third bias member 255 respectively. Further, hinge elements 266, 268 extend from pivot end 242. In this way, pivot end 242 can rotate about the pivot structure created by the hinge elements 266, 268 and second bias member 254 and third bias member 255, as detachable section is translated the distance x.

The extension of detachable section 240 may also cause second bias member 254 and third bias member 255 to flex, creating an upward bias. The flexing of second bias member 254 and third bias member 255 may be accompanied by movement of the pivot structure in a direction outward from housing 110. Preferably, the outward movement of the pivot structure is limited, so that hinge elements 266, 268 are still confined within housing 110.

Figure 8:
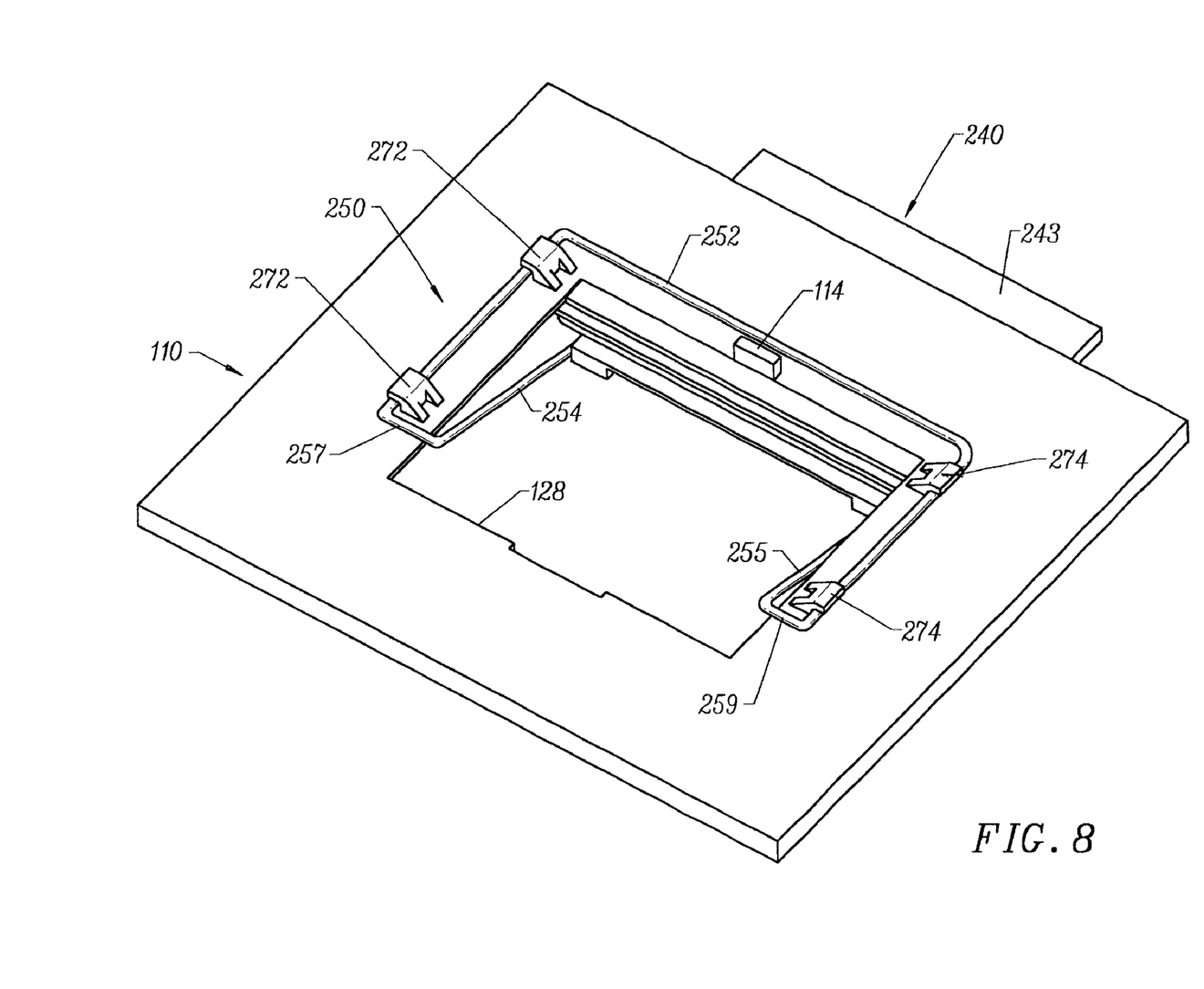
FIG. 8 is an isometric view of the door mechanism fully extended from the housing, under an embodiment of the invention.

FIG. 8 illustrates detachable section 240 in a fully extended position relative to housing 110. In an embodiment, in the extended position, detachable section 240 is positioned so that exterior side 243 abuts exterior surface 116 of housing 110. As a result, opening 128 created by detachable section 240 is maximized. In this position, first bias member 252 is flexed on stop 114. The second bias member 254 and third bias member 255 are extended from opening 128 away from housing 110. The u-shaped sections 257, 259 of hinge structure 250 may be under a torsional effect with the bias resulting from the movement of second bias member 254 and third bias member 255. The first and second pairs of grips 272, 274 may retain first and second position members 256 and 258 respectively, so that support is provided for extending and biasing second bias member 254 and third bias member 255. The first bias member 252 is flexed against stop 114. The stop 114 and the pairs of grips 272, 274 also preclude hinge structure 250 from moving further towards opening 128.

In an embodiment, detachable section 240 pivots so as to provide a vanity shield for opening 128. Specifically, when detachable section 240 is pivoted to the extended position, a portion of detachable section 240 including pivot end 242, partially shields the housing's interior from view.

Figure 9:
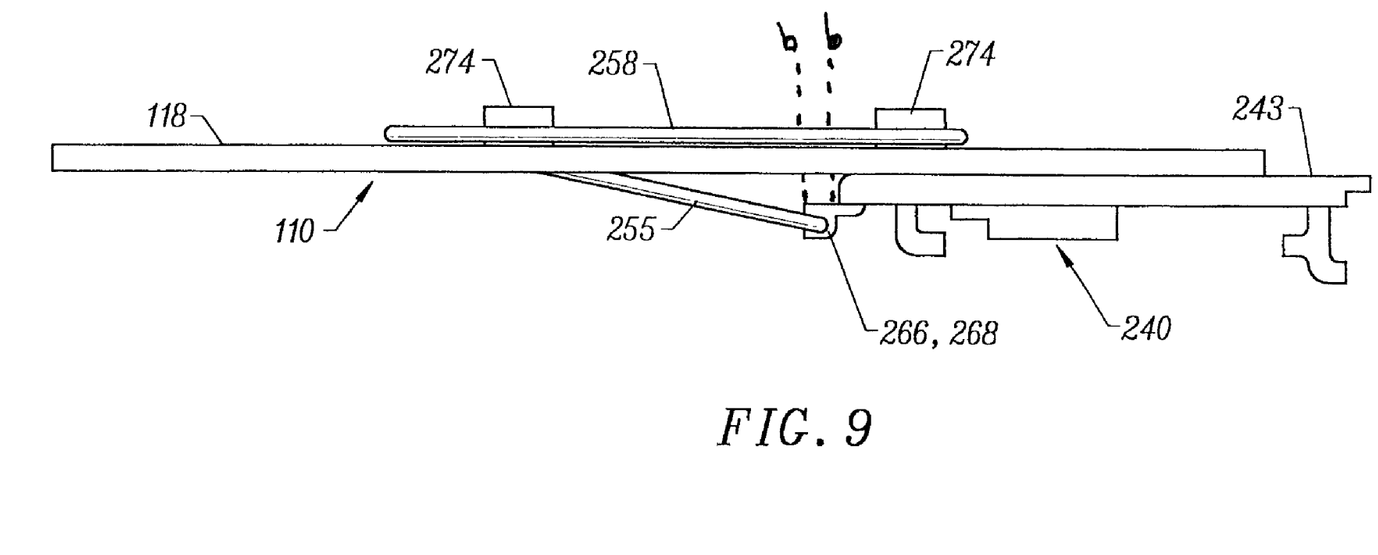
FIG. 9 is a side view of the door mechanism fully extended from the housing so as to contact a surface of the housing, under an embodiment of the invention.

FIG. 9 is a side-view of door mechanism 220, showing detachable section 240 fully extended from housing 110. In an embodiment, detachable section 240 may extend up until exterior side 243 makes contact with housing 110. The first pair of grips 272 (See FIG. 8) and second pairs of grips 274 secure respective first position member 256 (FIG. 8) and second position member 258 against interior surface 118. The second bias member 254 (FIG. 8) and third bias member 255 are extended outward and beyond housing 110. As a result, the pivot structures formed by first hinge elements 266 and second bias member 254, as well as second hinge element 268 and third bias member 255, are positioned outside of housing 110. The position of detachable section 240 causes first bias member 252 to bias against stop 114 as it flexes, and causes second bias member 254 and third bias member 255 to bias by extending.

In one embodiment, detachable section 240 has a pivot angle that ranges between approximately 0–180 degrees about hinge elements 266, 268. Other embodiments may provide for detachable section 240 to have a maximum pivot angle exceeding 180 degrees. The pivot end 242 is aligned outside the housing to overlay a portion of opening 128, as shown by arrows b—b. As such, pivot end 242 is configured to provide a vanity shield to shield the portion of the interior that is otherwise viewable when detachable section 240 is pivoted.

Figure 10:
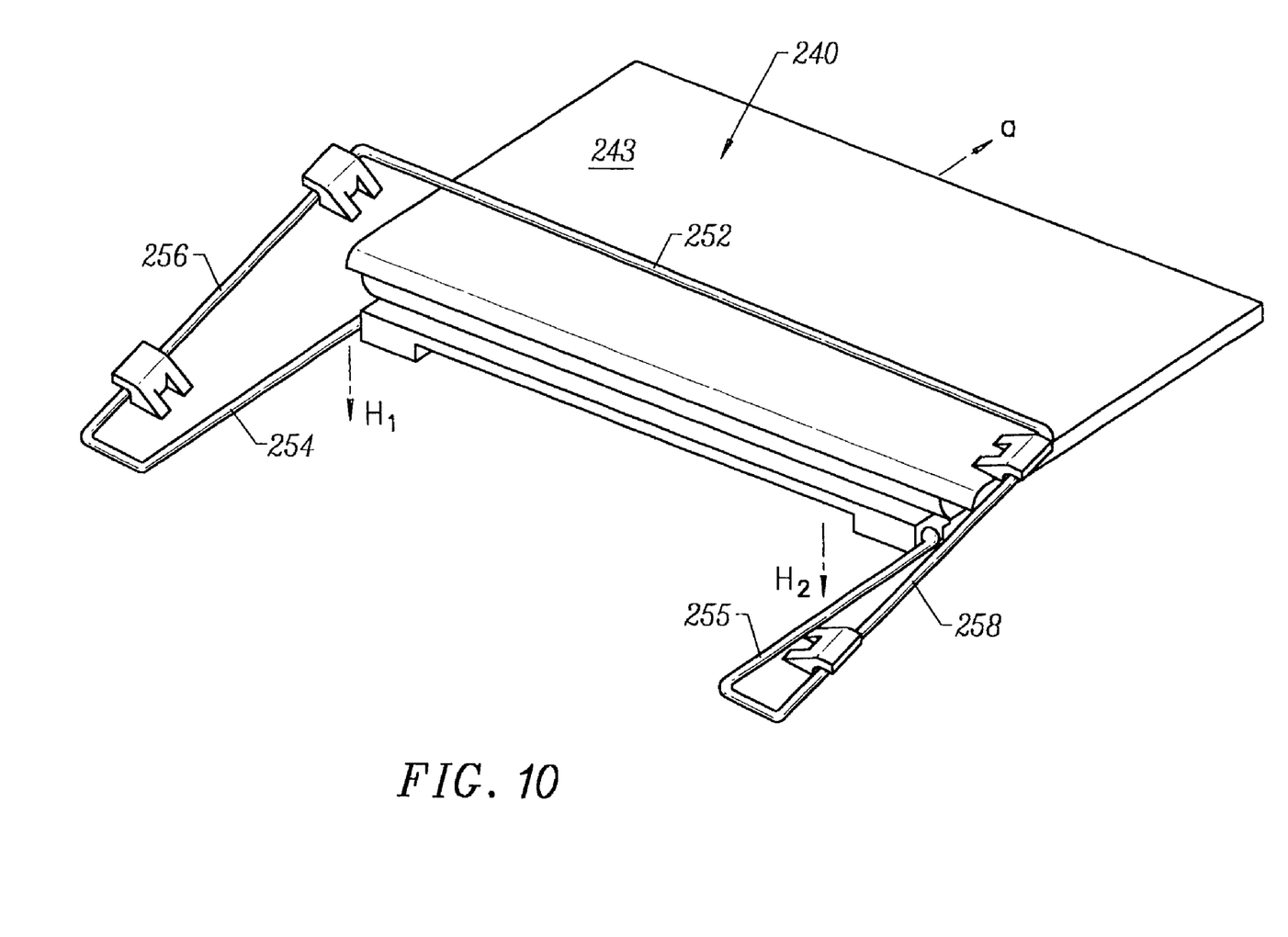
FIG. 10 is an isometric view of the door mechanism fully extended, shown without the housing, under an embodiment of the invention.

FIG. 10 is an isometric view of door mechanism 220, shown the configuration of detachable section 240 in the extended position, without housing 110. When extended, first bias member 252 is flexed to bias along arrow a. The first and second position members 256, 258 extend along second axis $y_2$. The second bias member 254 and third bias member 255 are biased and extended outward, at least partially along a third axis $y_3$, where $y_1$, $y_2$ and $y_3$ are assumed to be orthanormal.

Figure 11:
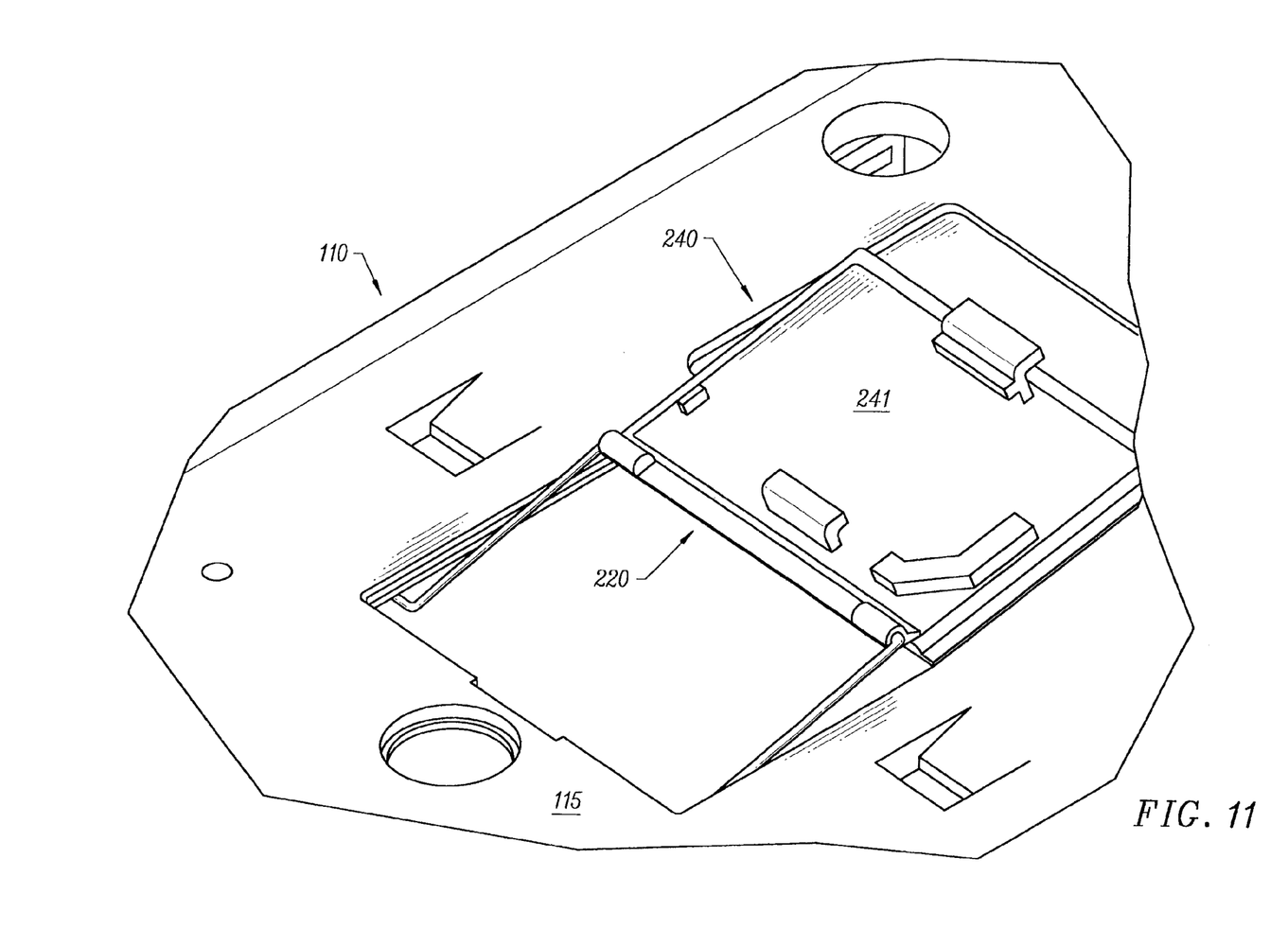
FIG. 11 is an isometric view of a back face of the handheld computer, showing a detachable section of the door mechanism fully extended on it, under an embodiment of the invention.

FIG. 11 illustrates back face 115 of housing 110, with detachable section 240 fully extended. When extended, exterior side 243 of detachable section 240 is adjacent or even in contact with exterior surface 116 of housing 110. The interior side 241 of detachable section 240 is acutely angled with respect to back face 115.

D. Operation of Door Mechanism

Under an embodiment of the invention, door mechanism 220 may be operated by a user pulling detachable section 240 from the closed position. As detachable section 240 is opened towards 90 degrees, hinge elements 266, 268 are moved with the hinge structure 250 to a new position within the interior of the handheld computer. When detachable section 240 is held open at 90 degrees, hinge elements 266, 268 are at the end of the translation, but still within housing 110. The first bias member 252 is flexed by stop 114 towards pulling hinge structure 250 back to the closed position.

As detachable section 240 is extended past 90 degrees, second bias member 254 and third bias member 255 are extended outward from the housing. As a result, hinge element 266, 268 are moved outside of housing 110, enabling detachable section 240 to pivot further past 90 degrees. Concurrently, second bias member 254 and third bias member 255 are biased when they extend out of the housing. The bias of second bias member 254 and third bias member 255 is directed towards pulling hinge elements 266, 268 back into the housing, and swinging detachable section 240 towards the closed position.

In an embodiment, detachable section 240 can be pivoted backwards until exterior side 243 is in contact with housing 110. The coupling structure 247 enables users to insert an electrical component into the housing 110. The electrical component may be coupled to a contact within housing 110 by detachable section 240 returning to the closed position.

In an embodiment, first bias member 252, second bias member 254, and third bias member 255 are configured to provide sufficient bias so as to cause detachable section 240 to return to the closed position from any extended position, including from the fully extension position where detachable section 240 is pushed against housing 110.

E. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A handheld computer comprising:
   a housing including a first face having an interior surface and an exterior surface; and
   a detachable section extendable from the interior surface of the first face to an extended position, the detachable section being biased to move towards the housing from the extended position, an interior of the detachable section including a coupling structure to couple a component to the detachable section and to position the component to make electrical contact with another element retained within a space confined by the housing;
   wherein the extended position corresponds to the detachable section being pivoted so that the exterior side of the detachable section is adjacent to the exterior side of the housing.

2. The handheld computer of claim 1, wherein the coupling structure is a slot formed on the interior surface of the detachable section.

3. The handheld computer of claim 1, further comprising a hinge structure that couples the detachable section to the interior surface of the housing.

4. The handheld computer of claim 1, further comprising a display accessible from a second face of the housing, wherein the second face opposes the first face.

5. A handheld computer comprising:
   a housing; and
   a detachable section moveably coupled to the housing to move from a closed position against the housing to an extended position, the detachable section forming an angle that is greater than 90 degrees with the housing when in the extended position, the door being positionable to overlay an interior space of the housing;
   wherein a pivot end of the detachable section is moveable from an interior position of the housing to an exterior position of the housing; and
   wherein the detachable section is moveable to an intermediate position between the closed position and the extended position corresponding to the pivot end being within the housing and the detachable section being extended up to about 90 degrees relative to the housing.

6. The handheld computer of claim 5, wherein the detachable section is extendable beyond 90 degrees relative to the housing upon the pivot end being moved outside of the housing.

7. The handheld computer of claim 6, further comprising a hinge structure coupled to the interior surface of the housing and including at least a first length that is extendable from the housing, the first length being coupled to the pivot end to allow the door to pivot while the pivot end moves from the interior position to the exterior position.

8. The handheld computer of claim 5, wherein the detachable section overlays an electrical component stored in the interior space of the housing.

9. A handheld computer comprising:
   a housing including a first face and a second face, the first face including an interior surface and an exterior surface;
   a detachable section moveably coupled to the interior surface of the first face to move from a closed position against the housing to an extended position;
   a hinge structure coupled to the interior surface of the housing, the hinge structure including a first member extending along a first direction within the housing, the first member flexing about a length to bias the detachable section in a second direction, the hinge structure including a second member and a third member pivotally coupled to a pivot end of the detachable section, the second and third members extending within the housing in the second direction and extendable in a third direction outside of the housing to allow the detachable section to move to the extended position.

10. The handheld computer of claim 9, wherein the second and third member of the hinge structure bias when extended in the third direction to move back inside of the housing.

11. The handheld computer of claim 9, wherein the detachable section of the handheld computer includes a free end that separates from the housing upon the pivot end pivoting about the second and third members of the hinge structure.

12. The handheld computer of claim 9, wherein the hinge structure is coupled to the detachable section to translate within the housing upon a free end of the detachable section being separated from the housing when the detachable section is in the closed position.

13. The handheld computer of claim 12, wherein the hinge structure is coupled to the detachable section to translate in the second direction.

14. A handheld computer comprising:
   a housing including a first face having an interior surface and an exterior surface;
   a detachable section moveably coupled to the housing to move from a closed position against the housing to an extended position, the detachable section forming an angle greater than 90 degrees with the exterior surface of the housing when in the extended position;
   a hinge structure coupled to the interior surface of the first face and to the detachable section, the hinge structure being moveable from a first position corresponding to the detachable section being in the closed position to a second position corresponding to the detachable section being in a partially extended position in which the detachable section is extended up to about 90 degrees with the exterior surface of the housing, the hinge structure being moveable to a third position corresponding to the detachable section being in an extended position; wherein the first position and the second position of the hinge structure correspond to the hinge structure being within the housing, and the third position of the hinge structure correspond to the hinge structure being outside of the housing.

15. The handheld computer of claim 14, wherein the detachable section includes an interior side and an exterior side when the detachable section is in the closed position, wherein the detachable section is moveable so that the exterior side is proximate to an exterior surface of the first face.

16. The handheld computer of claim 15, wherein the detachable section is moveable so that the exterior side contacts the exterior surface of the first face.

* * * * *